United States Patent
Harinath et al.

(10) Patent No.: US 11,148,129 B2
(45) Date of Patent: Oct. 19, 2021

(54) SYSTEMS AND METHODS FOR REMANUFACTURING SELECTIVE CATALYTIC REDUCTION SYSTEMS

(71) Applicant: Cummins Emission Solutions Inc., Columbus, IN (US)

(72) Inventors: Arvind V. Harinath, Columbus, IN (US); Behnam Bahrami, Indianapolis, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 651 days.

(21) Appl. No.: 16/071,395

(22) PCT Filed: Jan. 20, 2017

(86) PCT No.: PCT/US2017/014345
§ 371 (c)(1),
(2) Date: Jul. 19, 2018

(87) PCT Pub. No.: WO2017/127685
PCT Pub. Date: Jul. 27, 2017

(65) Prior Publication Data
US 2021/0170388 A1    Jun. 10, 2021

Related U.S. Application Data

(60) Provisional application No. 62/281,928, filed on Jan. 22, 2016.

(51) Int. Cl.
*B01J 38/48* (2006.01)
*B01D 53/94* (2006.01)
(Continued)

(52) U.S. Cl.
CPC ........ *B01J 38/485* (2013.01); *B01D 53/9418* (2013.01); *B01D 53/9431* (2013.01);
(Continued)

(58) Field of Classification Search
CPC ...... B01J 38/485; F01N 3/2896; F01N 3/208; F01N 11/00; F01N 2450/30;
(Continued)

(56) References Cited

U.S. PATENT DOCUMENTS

| | | |
|---|---|---|
| 2001/0033815 A1 | 10/2001 | Neuhausen et al. |
| 2009/0277159 A1 | 11/2009 | Driscoll et al. |

(Continued)

FOREIGN PATENT DOCUMENTS

CN   101655026   2/2010

OTHER PUBLICATIONS

International Search Report and Written Opinion issued for PCT/US20175014345, dated Mar. 31, 2017, 18 pages.
(Continued)

*Primary Examiner* — Brandon D Lee
(74) *Attorney, Agent, or Firm* — Foley & Lardner LLP

(57) ABSTRACT

An aftertreatment system comprises an aftertreatment component. An outlet sensor is positioned downstream of the aftertreatment component. A controller is communicatively coupled to the outlet sensor. The controller is configured to interpret an outlet signal from the outlet sensor. The outlet signal is indicative of a performance of the aftertreatment component. The controller determines if the aftertreatment component has deactivated. In response to determining that the aftertreatment component has deactivated, the controller provides a catalyst active material to at least a portion of the aftertreatment component. The catalyst active material coats at least the portion of the aftertreatment component so as to remanufacture the aftertreatment component.

19 Claims, 9 Drawing Sheets

(51) Int. Cl.
    *B01D 53/96*     (2006.01)
    *F01N 3/20*     (2006.01)
    *F01N 3/28*     (2006.01)
    *F01N 11/00*     (2006.01)

(52) U.S. Cl.
    CPC .......... *B01D 53/9495* (2013.01); *B01D 53/96* (2013.01); *F01N 3/208* (2013.01); *F01N 3/2896* (2013.01); *F01N 11/00* (2013.01); *F01N 2450/30* (2013.01); *F01N 2610/10* (2013.01); *F01N 2610/1406* (2013.01); *F01N 2610/1453* (2013.01); *F01N 2900/1602* (2013.01)

(58) Field of Classification Search
    CPC ......... F01N 2610/10; F01N 2900/1602; F01N 2610/1453; F01N 2610/1406; B01D 53/9495; B01D 53/9418; B01D 53/9431; B01D 53/96
    See application file for complete search history.

(56) References Cited

U.S. PATENT DOCUMENTS

| | | | |
|---|---|---|---|
| 2010/0043400 A1* | 2/2010 | Wang | F01N 3/2066 60/276 |
| 2014/0030159 A1* | 1/2014 | SerVaas | F01N 3/28 422/178 |
| 2014/0250867 A1 | 9/2014 | Yonemura et al. | |
| 2014/0342901 A1* | 11/2014 | Park | B01J 38/60 502/27 |
| 2015/0292384 A1 | 10/2015 | Devarakonda | |
| 2016/0312675 A1* | 10/2016 | Liu | F01N 11/00 |

OTHER PUBLICATIONS

First Office Action in Chinese Patent Application No. CN 201780007228.5, dated Jan. 26, 2021.

\* cited by examiner

SYSTEMS AND METHODS FOR REMANUFACTURING SELECTIVE CATALYTIC REDUCTION SYSTEMS

CROSS REFERENCE TO RELATED APPLICATIONS

This application is a National Stage of PCT Application No. PCT/US2017/014345 filed Jan. 20, 2017, which claims priority to U.S. Provisional Patent Application No. 62/281,928, entitled "SYSTEMS AND METHODS FOR REMANUFACTURING SELECTIVE CATALYTIC REDUCTION SYSTEMS," filed on Jan. 22, 2016. The contents of both applications are incorporated herein by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines generally include catalytic oxidation and/or reduction components for decomposing constituents of an exhaust gas produced by gasoline, natural gas, dual-fuel, liquefied petroleum gas (LPG), ethanol and/or biodiesel engines. For example, aftertreatment systems for use with diesel engines may include three-way catalysts (TWCs), oxidation catalyst (e.g., a diesel oxidation catalyst (DOC)) to reduce the amount of CO and HC present in the exhaust gas via oxidation techniques and/or a selective catalytic reduction (SCR) system which includes a catalyst formulated to convert NOx (NO and $NO_2$ in some fraction) into harmless nitrogen gas ($N_2$) and water vapor ($H_2O$) in the presence of ammonia ($NH_3$). A reductant is often inserted into exhaust conduits communicating the exhaust gas to the SCR system and/or other components of the aftertreatment system, for example to facilitate decomposition of the NOx gases included in the exhaust gas.

A catalyst may also be provided in one or more filters (e.g., a diesel particulate filter (DPF)) included in the aftertreatment system. The filters may remove harmful particulate matter and soot present in the exhaust gas and also produce $NO_2$ for SCR reaction. The catalyst included in the particulate filter may be used for passive regeneration of the filter by catalyzing the decomposition (e.g., oxidation) of the particulate matter accumulated on the filter The catalyst included in the SCR system or any other aftertreatment components of the aftertreatment system (e.g., the oxidation catalyst, TWC, catalyst on filter, ammonia oxidation catalyst etc.) may experience degradation in performance after repeated use. This leads to a decline in a catalytic conversion efficiency of the aftertreatment component, for example due to poisoning or otherwise deactivation (e.g., due to irreversible catalytic reactions, decomposition, oxidation, reduction, etc.) after operation over extended periods of time. The decline in catalytic conversion efficiency may lead to the increase in the amount of NOx gases emitted from the aftertreatment system beyond allowable limits, for example as set by emission standards. Generally, once the performance of the catalyst of the aftertreatment component degrades below acceptable levels, the catalyst is replaced. Because catalysts are generally expensive, the replacement of the catalyst adds significant cost to the maintenance of the aftertreatment system. Replacement of the catalyst also results in operational downtime of the system employing the aftertreatment system, thereby adding an additional cost burden.

SUMMARY

Embodiments described herein relate generally to systems and methods of remanufacturing degraded aftertreatment components and in particular, to systems and methods of coating a deactivated catalyst included in an aftertreatment component with a catalyst active material so as to remanufacture the aftertreatment component.

In a first set of embodiments, an aftertreatment system comprises an aftertreatment component. An outlet sensor is positioned downstream of the aftertreatment component. A controller is communicatively coupled to the outlet sensor. The controller is configured to interpret an outlet signal from the outlet sensor. The outlet signal is indicative of a performance of the aftertreatment component. The controller determines if the aftertreatment component has deactivated. In response to determining that the aftertreatment component has deactivated, the controller provides a catalyst active material to at least a portion of the aftertreatment component. The catalyst active material coats at least the portion of the aftertreatment component so as to remanufacture the aftertreatment component.

In another set of embodiments, a method comprises providing an aftertreatment component of an aftertreatment system. The aftertreatment component includes a catalyst which has been used in the aftertreatment system. In response to an indication that the catalyst is deactivated, the catalyst is coated with a coating of a catalyst active material so as to remanufacture the catalyst.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 6 panel B is an enlarged view of the catalyst of FIG. 6 panel A; FIG. 6 panel C is a side view of the catalyst of FIG. 6 panel A/B after coating with 10% catalyst active material; and FIG. 6 panel D is an enlarged view of the catalyst of FIG. 6 panel C; FIG. 6 panel E is a side view of the catalyst of FIG. 6 panel A/B after coating with 20% catalyst active material; and FIG. 6 panel F is an enlarged view of the catalyst of FIG. 6, panel E.

Figure 1:
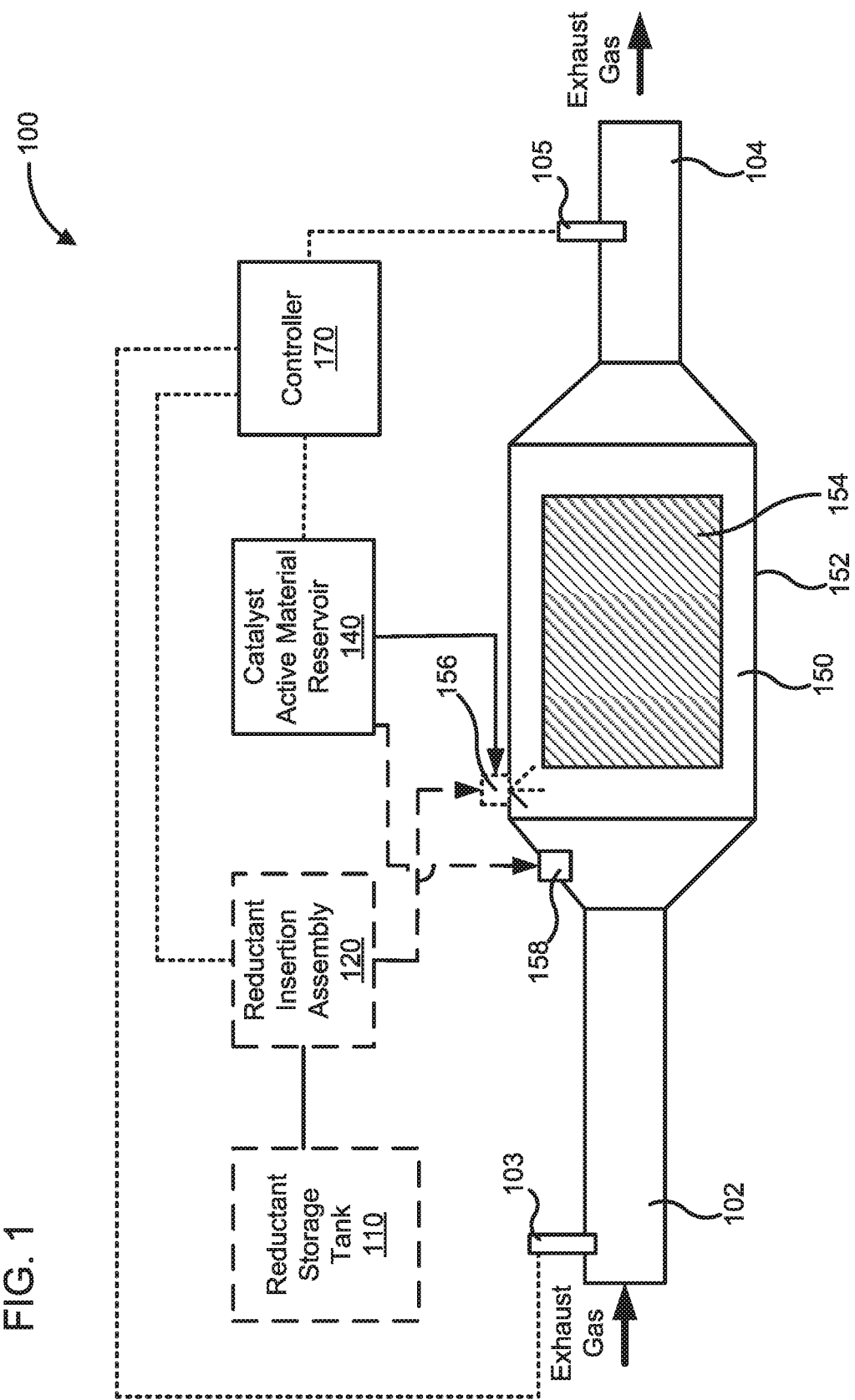
FIG. 1 is a schematic illustration of an aftertreatment system according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of remanufacturing degraded aftertreatment components and, in particular, to systems and methods of coating a deactivated catalyst included in an aftertreatment component with a catalyst active material so as to remanufacture the aftertreatment component.

Various aftertreatment components included in aftertreatment systems may include one or more catalysts formulated to decompose various components of an exhaust gas flowing through the aftertreatment system. Such aftertreatment components may include oxidation catalysts, ammonia oxidation catalysts, catalyzed particulate filters and/or SCR systems. The one or more catalysts may experience degradation in performance after repeated use. This leads to a decline in a catalytic conversion efficiency of the aftertreatment component, for example due to poisoning or otherwise deactivation (e.g., due to irreversible catalytic reactions, decomposition, oxidation, reduction, etc.) during operation in the field.

The decline in catalytic conversion efficiency may ultimately lead to deactivation of the aftertreatment component. For example, decline in catalytic conversion activity of the SCR system leads to an increase in the amount of NOx gases emitted from the aftertreatment system beyond allowable limits, for example as set by emission standards. Generally, once the performance of the catalyst of the SCR system (or any other aftertreatment component described herein) degrades below acceptable levels, the catalyst is replaced. Because catalysts are generally expensive, the replacement of the catalyst adds significant cost to the maintenance of the aftertreatment system. Replacement of the catalyst also results in operational downtime of the system employing the aftertreatment system, thereby adding an additional cost burden.

Various embodiments of the systems and methods described herein for remanufacturing at least a portion of an aftertreatment component may provide benefits including, for example: (1) allowing in-situ coating of a catalyst of an aftertreatment components such as a SCR system with a predetermined amount of a catalyst active material, thereby increasing a catalytic conversion efficiency of the aftertreatment component to within acceptable levels; (2) allowing remanufacturing of the aftertreatment component on-site without removal of the aftertreatment component from the aftertreatment system, thereby reducing system downtime; and (3) extending the life of the catalyst included in the aftertreatment component, thereby reducing maintenance cost.

FIG. 1 is a schematic illustration of an aftertreatment system 100, according to an embodiment. The aftertreatment system 100 may be fluidly coupled to an engine and configured to decompose constituents (e.g., carbon monoxide, unburnt hydrocarbons, NOx gases, etc.) included in an exhaust gas produced by the engine. The engine can include an IC engine operable on diesel, gasoline, natural gas, biodiesel, ethanol, liquefied petroleum gas (LPG) or any other fuel source. The aftertreatment system 100 includes an aftertreatment component 150, a controller 170, and in some embodiments a reductant storage tank 110, a reductant insertion assembly 120, a catalyst active material reservoir 140.

The aftertreatment system 100 includes an inlet conduit 102 structured to receive the exhaust gas (e.g., a diesel exhaust gas) from an engine (e.g., a diesel engine), and an outlet conduit 104 to expel treated exhaust gas into the environment. An inlet NOx sensor 103 is positioned upstream of the aftertreatment component 150 proximate to an inlet of the inlet conduit 102 and is configured to determine an inlet NOx amount of NOx gases included the exhaust gas entering the aftertreatment system 100. The aftertreatment component 150 is positioned between the inlet conduit 102 and the outlet conduit 104. An outlet sensor 105 is positioned downstream of the aftertreatment component 150, for example in the outlet conduit 104 and is configured generate an outlet signal indicative of a performance (e.g., a catalytic conversion efficiency) of the aftertreatment component 150. For example, the aftertreatment component 150 may include an SCR system, and the outlet sensor 105 may include an outlet NOx sensor 105 configured to determine an outlet NOx amount of NOx gases included in the exhaust gas after passing through the SCR system 150. If the outlet NOx amount exceeds a predetermined threshold, this may indicate that the SCR system 150 (e.g., the catalyst 154 included therein) has degraded or deactivated.

As described herein, the terms "degraded" or "deactivated" refers to an aftertreatment component 150 (e.g., the SCR system 150) that is performing below a predetermined performance level. For example, an aftertreatment component 150 may be degraded or deactivated if a catalytic conversion efficiency of the aftertreatment component falls below a predetermined level, an exhaust gas passing through the aftertreatment component 150 (e.g., the SCR system 150) includes an amount of constituents (e.g., NOx gases) higher than a maximum allowable amount (e.g., as set by various engineering standards or emission standards) and/or a temperature or pressure across the aftertreatment component 150 is above or below a predetermined threshold.

In some embodiments, the inlet NOx sensor 103 can include a physical NOx sensor. In other embodiments, the inlet NOx sensor 103 can include a virtual NOx sensor configured to determine the inlet NOx amount based on one or more operating parameters of the engine generating the exhaust gas (e.g., an air/fuel ratio, compression ratio, combustion temperature, exhaust gas temperature, exhaust gas pressure, etc.). For example, the controller 170 can include models, look up tables, algorithms and/or equations configured to determine the inlet NOx amount using the one or more operating parameters of the engine generating the exhaust gas. Similarly, in embodiments in which the outlet sensor 105 includes an outlet NOx sensor, the outlet NOx sensor 105 can also include a physical NOx sensor or a virtual NOx sensor configured to determine the outlet NOx amount based on one or more engine parameters, life of the SCR system 150 or any other parameter.

The aftertreatment component 150 includes a housing 152 defining an internal volume within which a catalyst 154 is positioned. Various non-limiting examples of the aftertreatment component 150 which may be included in the aftertreatment system 100 includes an SCR system, an oxidation catalyst, an ammonia oxidation catalyst, a catalyzed filter or any other aftertreatment component that includes a catalyst. FIG. 1 shows the aftertreatment system 100 including only a single aftertreatment component 150. In other embodiments, the aftertreatment system 100 may include any number of aftertreatment components positioned in any suitable configuration, at least portion of which include a catalyst to decompose various constituents (e.g., carbon monoxide, hydrocarbons, NOx gases, ammonia etc.) of the exhaust gas passing through the aftertreatment system 100.

For example, the aftertreatment component 150 may include a SCR system 150. The SCR system 150 includes a housing 152 defining an internal volume within which a catalyst 154 is positioned. The housing 152 may be formed from a rigid, heat resistance and corrosion resistant material, for example stainless steel, iron, aluminum, metals, ceramics or any other suitable material. The housing 152 can have any suitable cross-section, for example circular, square, rectangular, oval, elliptical, polygonal or any other suitable shape.

A reductant insertion port 156 is provided on a sidewall of housing 152 structured to allow insertion of a reductant therethrough into the internal volume defined by the housing 152. The reductant insertion port 156 may be positioned upstream of the catalyst 154 (e.g., to allow reductant to be injected or otherwise inserted into the exhaust gas upstream of the catalyst 154) or over the catalyst 154 (e.g., to allow reductant to be inserted directly on the catalyst 154).

A temperature sensor port 158 may also be provided on the housing 152, for example upstream of the catalyst 154. The temperature sensor port 158 is structured to receive a temperature sensor, for example, a thermocouple, a thermistor, a resistance temperature detector (RTD) sensor or any other temperature sensor. The temperature sensor inserted into the temperature sensor port 158 enables determination of an inlet temperature of the exhaust gas entering the SCR system. In some embodiments, an outlet temperature sensor port (not shown) may also be provided on the housing 152. A second temperature sensor may be inserted into the outlet temperature sensor port, thereby allowing determination of an outlet temperature of the exhaust gas after passing through the SCR system 150.

The catalyst 154 of the SCR system 150 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide, and NOx gases.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas can include a diesel exhaust gas and the reductant can include a diesel exhaust fluid.

The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®). For example, the reductant may include an aqueous urea solution having a particular ratio of urea to water. In particular embodiments, the reductant can include an aqueous urea solution including 32.5% by volume urea and 67.5% deionized water.

A reductant insertion assembly 120 is fluidly coupled to the reductant storage tank 110. The reductant insertion assembly 120 is configured to selectively inject or otherwise insert the reductant into the SCR system 150 or upstream thereof (e.g., into the inlet conduit 102) or a mixer (not shown) positioned upstream of the SCR system 150. The reductant insertion assembly 120 may include various structures to facilitate receipt of the reductant from the reductant storage tank 110 and delivery to the SCR system 150.

For example, the reductant insertion assembly 120 may include one or more pumps having filter screens (e.g., to prevent solid particles of the reductant or contaminants from flowing into the pump), and/or valves (e.g., check valves) positioned upstream thereof to receive reductant from the reductant storage tank 110. In some embodiments, the pump may include a diaphragm pump but any other suitable pump may be used such as, for example a centrifugal pump, a suction pump, etc. The pump is configured to pressurize the reductant so as to provide the reductant to the SCR system 150 at a predetermined pressure. Screens, check valves, pulsation dampers or other structures may also be positioned downstream of the pump to provide the reductant to the SCR system 150. In various embodiments, the reductant insertion assembly 120 may also include a bypass line structured to provide a return path of the reductant from the pump to the reductant storage tank 110.

A valve (e.g., an orifice valve) may be provided in the bypass line. The valve may be structured to allow the reductant to pass therethrough to the reductant storage tank 110 if an operating pressure of the reductant generated by the pump exceeds a predetermined pressure so as to prevent over pressurizing of the pump, the reductant delivery lines or other components of the reductant insertion assembly 120. In some embodiments, the bypass line may be configured to allow return of the reductant to the reductant storage tank 110 during purging of the reductant insertion assembly 120 (e.g., after the aftertreatment system 100 is shut off).

In various embodiments, the reductant insertion assembly 120 may also include a blending chamber structured to receive pressurized reductant from a metering valve at a controllable rate. The blending chamber may also be structured to receive air (or any other inert gas, e.g., nitrogen), for example from an air supply unit so as to deliver a combined flow of the air and the reductant to the SCR system 150 through the reductant insertion port 156. In various embodiments, a nozzle may be positioned in the reductant insertion port 156 and is structured to deliver a stream or a jet of the reductant into the internal volume of the housing 152 of the SCR system 150.

In various embodiments, the reductant insertion assembly 120 may also include a dosing valve positioned within a reductant delivery line for delivering the reductant from the reductant insertion assembly 120 to the SCR system 150. The dosing valve can include any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve or any other suitable valve. The dosing valve may be selectively opened to insert a predetermined quantity of the reductant for a predetermined time into the SCR system 150 or upstream therefrom.

The catalyst active material reservoir 140 may be included in the aftertreatment system 100 or be separate from the aftertreatment system 100. The catalyst active material reservoir 140 is structured to contain a catalyst active material. The catalyst active material can be the same as the catalyst 154 or a different catalyst active material and can include, for example, platinum, palladium, rhodium, cerium, iron, manganese, copper, vanadium based catalyst, any other suitable catalyst active material corresponding to the catalyst of the aftertreatment component 150, or a combination thereof. In some embodiments, the catalyst active material can be provided in the catalyst active material reservoir 140 with a washcoat which serves as a carrier material for the catalyst active material. Such washcoat materials can include, for example, aluminum oxide, titanium dioxide, silicon dioxide, any other suitable washcoat material, or a combination thereof.

In some embodiments, the catalyst active material reservoir 140 is configured to contain a solution or suspension of the catalyst active material. For example, the catalyst active material can be dissolved or suspended in a suitable media, for example water or solvents such as methanol, ethanol, acetone, etc. to form a solution or suspension of the catalyst active material. The catalyst active material reservoir 140 is configured to be fluidly coupled to the aftertreatment component 150 (e.g., the SCR system 150) so as to deliver the catalyst active material to the aftertreatment component 150 on demand. The catalyst active material coats at least a portion of the aftertreatment component 150, for example the catalyst 154 so as to remanufacture the aftertreatment component 150.

In some embodiments, the aftertreatment component 150 is remanufactured offline, i.e. after uncoupling and removing from the aftertreatment system 100. In such embodiments, the catalyst active material reservoir 140, which may be separate from the aftertreatment system 100 is fluidly coupled to the aftertreatment component 150. The catalyst active material reservoir 140 is activated so as to deliver the catalyst active material to the internal volume of the housing 152. The catalyst active material coats the catalyst 154, for example in an amount in the range of 0-100 wt % inclusive of all ranges and values therebetween, thereby remanufacturing the catalyst 154.

In other embodiments, the catalyst active material reservoir 140 is included in the aftertreatment system 100 and is fluidly coupled to the aftertreatment component 150. The catalyst active material reservoir 140 is structured to deliver the catalyst active material to the aftertreatment component 150 for a predetermined time on demand while the aftertreatment component 150 is online, i.e., still coupled to the aftertreatment system 100. The catalyst active material reservoir 140 may be fluidly coupled to the aftertreatment component 150 using existing openings or ports defined on the housing 152 of the aftertreatment component 150.

Such ports can include, for example temperature sensor ports (e.g., the temperature sensor port 158), pressure sensor ports, NOx sensor ports, a reductant insertion port (e.g., the reductant insertion port 156) or any other suitable port or opening defined in the housing 152. In this manner, the catalyst 154 may be coated with the catalyst active material without removing the catalyst 154 from the housing 152 of the aftertreatment component 150.

The catalyst active material may be coated on any portion of the catalyst 154 in any suitable configuration. For example, the catalyst active material may be coated in a layered arrangement on the catalyst 154. In other embodiments, the catalyst active material may be coated on a zone or portion of the catalyst 154 (e.g., proximate to an inlet of the catalyst 154).

In embodiments in which the aftertreatment component 150 includes the SCR system, the performance of the SCR system 150 might degrade to a level where the SCR system 150 has a first catalytic conversion efficiency at which the outlet NOx amount (e.g., determined by the outlet NOx sensor 105) exceeds a predetermined threshold (e.g., a maximum allowable outlet NOx amount as set by an emission standard). The catalyst active material reservoir 140 may be activated to selectively deliver the catalyst active material to the SCR system 150 in-situ (i.e., without removing the SCR system 150 or the catalyst 154 from the aftertreatment system 100) so as to remanufacture the catalyst 154.

In other embodiments, once it is determined that the SCR system 150 has deactivated (e.g., the catalyst 154 of the SCR system 150 has deactivated) the SCR system 150 may be removed from the aftertreatment system 100. The catalyst active material reservoir 140 is then fluidly coupled to the SCR system housing 152 (e.g., via the reductant insertion port 156 or the temperature sensor port 158) so as to deliver a predetermined amount of the catalyst active material (e.g., in the range of 0-100 wt % inclusive of all ranges and values therebetween), thereby coating at least a portion of the catalyst 154 of the SCR system 150 and remanufacturing the SCR system 150.

Expanding further, the catalyst active material solution or suspension delivered to the aftertreatment component 150 (e.g., the SCR system 150) for the predetermined time causes the catalyst active material to form a coating thereof on at least a portion of the aftertreatment component 150 (e.g., on a surface of the catalyst 154). The coating of the fresh catalyst active material increases the catalytic conversion efficiency of the aftertreatment component 150 so that the aftertreatment component 150 has a second catalytic efficiency higher than the first catalytic conversion efficiency. For example, the second catalytic conversion efficiency enables the SCR system 150 to decomposes sufficient amount of the NOx gases included in the exhaust gas passing through the SCR system 150 so that the outlet NOx amount falls below the predetermined threshold (i.e., is within an acceptable range which is below the maximum allowable NOx amount which can be emitted by the aftertreatment system 100).

In various embodiments, delivering the catalyst active material for the predetermined time to the aftertreatment component 150 causes the catalyst active material to form a coating having a predetermined average thickness on a surface of the catalyst 154. In some embodiments, the predetermined time is selected so as to allow an amount of the catalyst active material in the range of 0-100 wt % inclusive of all ranges and values therebetween. In particular embodiments, the amount of active material to be coated or deposited on the catalyst 154 is in the range of 5 wt % to 30 wt % (e.g., 5, 6, 7, 8, 9, 10, 15, 20, 25 or 30 wt % inclusive of all ranges and values therebetween).

The catalyst active material reservoir 140 is included in the aftertreatment system 100 and fluidly coupled to the aftertreatment component 150 so as to deliver the catalyst active material upstream or on at least a portion of the catalyst 154 without removing the aftertreatment component 150 (e.g., the SCR system 150) from the aftertreatment system 10. A catalyst active material delivery assembly (not shown) may be fluidly coupled to the catalyst active material reservoir 140 and structured to deliver the catalyst active material (e.g., a solution or suspension of the catalyst active material) to the aftertreatment component 150. The catalyst active material delivery assembly may include any suitable structure, for example, pumps, valves, fluid conduits, filters, etc. for delivering the catalyst active material to the aftertreatment component 150.

In one embodiment in which the aftertreatment component 150 includes the SCR system 150, the catalyst active material reservoir 140 may be fluidly coupled to the SCR system 150 via the reductant insertion port 156 positioned on the housing 152 (e.g., upstream or over the catalyst 154). In such embodiments, the delivery of the reductant to the SCR system 150 may be stopped before delivering the catalyst active material to the SCR system 150. In other embodiments, the catalyst active material may be delivered sequentially after the reductant is delivered into the SCR system 150. For example, each of the reductant and the catalyst active material may be delivered in pulses to the SCR system 150 such that a catalyst active material delivery pulse occurs between two reductant delivery pulses.

For example, the engine fluidly coupled to the aftertreatment system 100 may be operated under low load conditions (e.g., idle or steady state conditions) for the predetermined time, for example to reduce an exhaust gas flow velocity and/or the amount of NOx gases produced by the engine. The catalyst active material solution or suspension contacts the exhaust gas and is delivered to the catalyst 154 to form a coat thereon as the exhaust gas flows through the SCR system 150. In some embodiments, the carrier media or fluid in which the catalyst active material is dissolved or suspended may evaporate on contacting the exhaust gas. This may release particles of the catalyst active material which are entrained in the exhaust gas and flow onto the SCR system 150 therewith to coat the catalyst 154.

In other embodiments, the catalyst active material may be delivered to the SCR system 150 simultaneously with the reductant. The engine may be operated under low load or high load conditions (e.g., during acceleration) during delivery of the catalyst active material to the SCR system 150 with the reductant. In still other embodiments, the catalyst active material may be delivered to the SCR system 150 once the aftertreatment system 100 is turned off. In such embodiments, the catalyst active material delivery assembly may be structured to deliver the catalyst active material under sufficient pressure to the SCR system 150 so as to allow coating of the catalyst 154 with the catalyst active material.

In some embodiments, the catalyst active material reservoir 140 may be fluidly coupled to the SCR system 150 via the temperature sensor port 158. For example, the temperature sensor port 158 may include an opening structured to receive a catalyst active material delivery line from the catalyst active material reservoir 140 and to allow delivery of the catalyst active material (e.g., a solution or suspension thereof) into the SCR system 150. The catalyst active material may be delivered to the SCR system 150 through the temperature sensor port 158 independently of the reductant delivered to the SCR system 150 (e.g., delivered simultaneously with the reductant, sequentially with the reductant or after a reductant delivery to the SCR system 150 is stopped).

While shown as including the aftertreatment component 150, the aftertreatment system 100 can also include other components, for example one or more flow mixers, temperature sensors, pressure sensors, oxygen sensors, ammonia sensors, and/or any other components.

The controller 170 is communicatively coupled to the outlet sensor 105, and optionally also to the catalyst active material reservoir 140, the inlet NOx sensor 103 and the reductant insertion assembly 120. The controller 170 may include any suitable controller, for example the computing device 630 as described in detail herein. The controller 170 is configured to interpret an outlet signal from the outlet sensor 105. The outlet signal is indicative of a performance of the aftertreatment component 150, for example a catalytic conversion efficiency of the aftertreatment component or if the aftertreatment component 150 has degraded. For example, the aftertreatment component 150 may include a SCR system 150 and the outlet sensor 105 includes an outlet NOx sensor 105. The outlet signal may correspond to an outlet NOx single indicative of the outlet NOx amount of NOx gases included in the exhaust gas after passing through the SCR system 150.

The controller 170 may determine if the aftertreatment component 150 has deactivated or otherwise degraded. For example, the controller 170 may determine the outlet NOx amount from the outlet NOx signal. For example, the controller 170 may include algorithms, look up tables or equations configured to correlate the reductant quality to determine the outlet NOx amount. The controller 170 may determine an absolute value of the outlet NOx amount. In some embodiments, the controller 170 is configured to determine an expected range of the outlet NOx amount from the outlet NOx signal.

In particular embodiments, the aftertreatment system 100 may include a plurality of aftertreatment components as described herein. The aftertreatment system 100 may include a plurality of sensors positioned and configured to determine a performance of a corresponding aftertreatment component. Each of the plurality of aftertreatment components may be communicatively coupled to the controller 170. Each of the plurality of sensors may generate an outlet signal indicative of the performance of the corresponding aftertreatment component. The controller 170 determines which of the aftertreatment components has deactivated and should be remanufactured.

In some embodiments, the controller 170 is configured to interpret an inlet NOx signal form the inlet NOx sensor 103, and determine the inlet NOx amount therefrom. The controller 170 may also use the inlet NOx amount to determine the outlet NOx amount (e.g., normalize or correct the outlet NOx amount determined by the outlet NOx sensor 105 using the inlet NOx amount).

In response to determining that the aftertreatment component 150 has deactivated, the controller 170 provides a catalyst active material to at least a portion of the aftertreatment component 150. The catalyst active material coats at least the portion of the aftertreatment component 150 so as to remanufacture the aftertreatment component 150, as described herein. For example, the controller 170 may activate the catalyst active material reservoir 140 included in the aftertreatment system 100 so as to deliver the catalyst active material to the aftertreatment component 150 without removing the aftertreatment component 150 from the aftertreatment system 100.

In other embodiments, the controller 170 may indicate to a user, for example via lighting a malfunction indicator lamp (MIL) or generating a fault code, that the aftertreatment component 150 has deactivated and has to be remanufactured. The user, a service technician, or other personnel may then remove the aftertreatment component 150 from the aftertreatment system 100 and remanufacture the aftertreatment component 150 without removing the catalyst 154 from the housing 152 of the aftertreatment component 150, as described herein.

The aftertreatment component 150 may include the SCR system 150. The controller 170 determines if the outlet NOx amount exceeds the predetermined threshold. In response to the outlet NOx amount exceeding the predetermined threshold (e.g., a maximum allowable amount of NOx which can be emitted by the aftertreatment system 100 during operation) the controller 170 activates the catalyst active material reservoir 140 for a predetermined time so as to deliver a predetermined amount of the catalyst active material to the SCR system 150.

In some embodiments, the controller 170 can activate the catalyst active material reservoir 140 irrespective of the operating state of the engine fluidly coupled to the aftertreatment system 100. For example, as soon as the controller 170 determines that the outlet NOx amount is exceeding the predetermined threshold, the controller 170 activates the catalyst active material reservoir 140 whether the engine is running under low load or high load conditions.

In some embodiments, the controller 170 may be configured to wait for a predetermined standby time after the aftertreatment system 100 is started before determining whether to activate the catalyst active material reservoir or not. This predetermined standby time may be selected so as to allow the aftertreatment system 100 to warm up to an operational temperature of the aftertreatment system. For example, if the SCR system 150 is cold, it may have a reduced catalytic conversion efficiency until it warms up to its operational temperature. This may allow the outlet NOx amount to exceed the predetermined threshold until the SCR system 150 warms up even if the catalyst 154 of the SCR system 150 is not degraded beyond acceptable levels. The predetermined standby time allows the SCR system 150 to warm up to the operational temperature before the controller 170 determines the outlet NOx amount. Once the SCR system 150 heats up to its operational temperature, the outlet NOx amount exceeding the predetermined threshold is attributable to the degradation of the catalyst 154 and not to the SCR system 150 being operated cold, thereby preventing false alarms.

In some embodiments, the controller 170 may be configured to deactivate the reductant insertion assembly 120 before activating the catalyst active material reservoir 140. In particular embodiments, the controller 170 may synchronize the delivery of the catalyst active material (e.g., a solution or suspension thereof) to the SCR system 150 with the delivery of the reductant thereto. For example, the controller 170 may alternately deliver the reductant and the catalyst active material to the SCR system 150 (e.g., via a series of sequential reductant delivery pulses and catalyst active material delivery pulses as described before).

In still other embodiments, the controller 170 may be configured to alert or otherwise indicate to a user that the SCR system 150 has degraded. For example, the controller 170 may generate a fault code or light a malfunction indicator lamp (MIL) (e.g., provided on a dashboard of a vehicle, industrial equipment, train engine, marine vessel or any other system including the engine and the aftertreatment system 100) indicating to the user that the SCR system has degraded beyond an acceptable level.

In some embodiments, the user may manually activate the catalyst active material reservoir 140 at any suitable time for the predetermined time so as to deliver the predetermined amount of catalyst active material to the SCR system 150. For example, the user may activate the catalyst active material reservoir 140 when the engine is turned off or is operating under low load conditions. In this manner, the SCR system 150 is remanufactured and recovers at least a portion of its catalytic conversion efficiency lost due to degradation.

Figure 2:
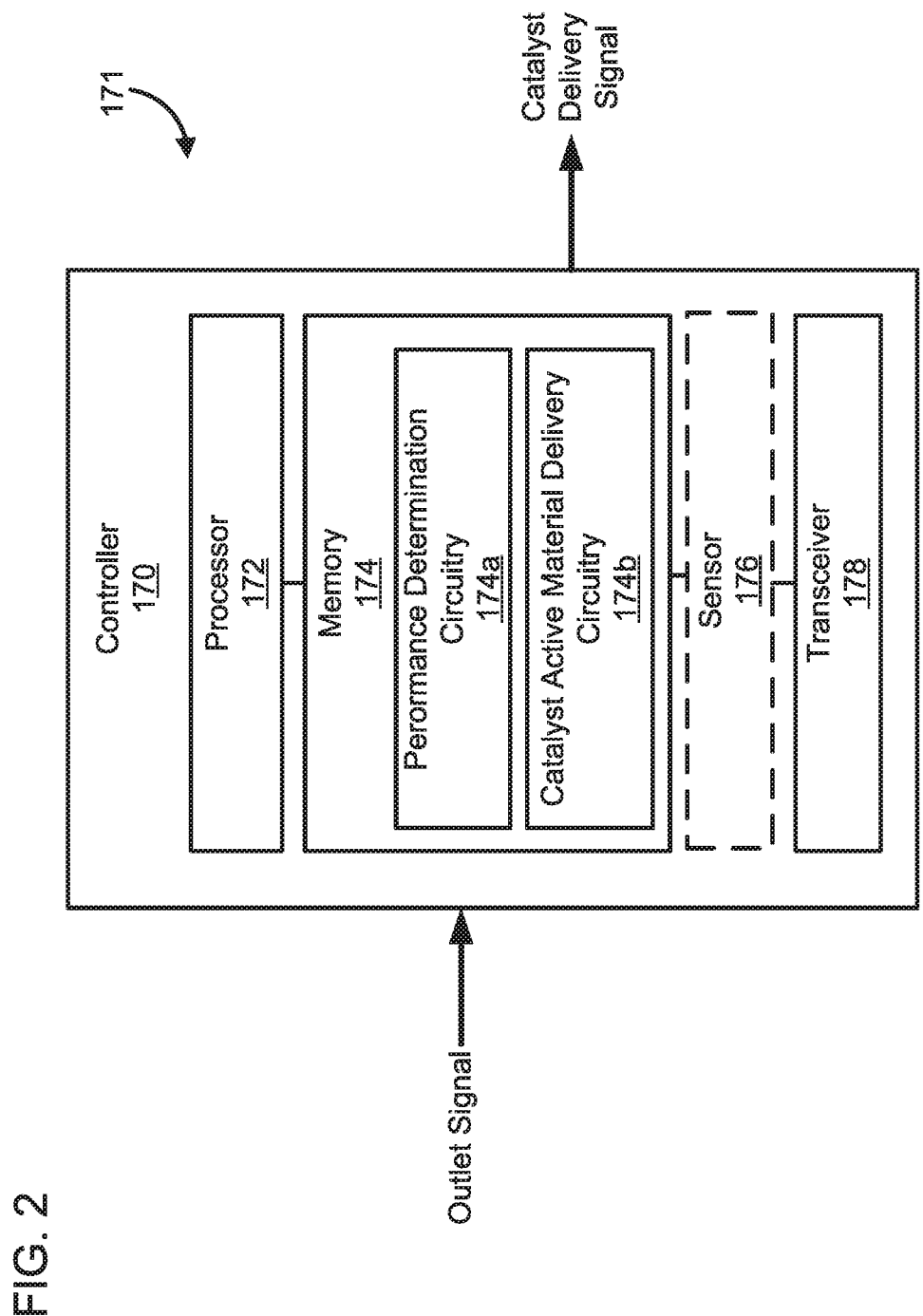
FIG. 2 is a schematic block diagram of an embodiment of a control circuitry which can be included in the aftertreatment system of FIG. 1.

In particular embodiments, the controller 170 can be included in a control circuitry. For example, FIG. 2 is a schematic block diagram of a control circuitry 171 that includes the controller 170 according to an embodiment. The controller 170 includes a processor 172, a memory 174 or other computer readable medium, a transceiver 178 and optionally, a sensor 176. It should be understood that the controller 170 shows only one embodiment of the controller 170 and any other controller capable of performing the operations described herein can be used.

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The memory 174 includes any of the memory and/or storage components discussed herein. For example, memory 174 may include RAM and/or cache of processor 172. The memory 174 may also include one or more storage devices (e.g., hard drives, flash drives, computer readable media, etc.) either local or remote to the controller 170. The memory 174 is configured to store look up tables, algorithms or instructions.

For example, the memory 174 includes a performance determination circuitry 174a structured to interpret the outlet signal from the outlet sensor 105 so as to determine the performance (e.g., catalytic conversion efficiency or whether the aftertreatment component 150 has deactivated) of the aftertreatment component 150. For example, the performance determination circuitry 174a may interpret the outlet NOx signal from the outlet NOx sensor 105 (e.g., via the sensor 176). As described before, the outlet NOx signal is indicative of the outlet NOx amount. The outlet NOx amount determination circuitry 174a may be configured determine the outlet NOx amount from the outlet NOx signal. The outlet NOx amount determination circuitry 174a determines if the outlet NOx amount exceeds the predetermined threshold (e.g., a maximum allowable NOx amount as described before herein).

The memory 174 also includes a catalyst active material delivery circuitry 174b configured to selectively activate the catalyst active material reservoir 140 (e.g., included in the aftertreatment system 100 or separate therefrom). For example, if the performance determination circuitry 174a determines that the aftertreatment component 150 has deactivated (e.g., the outlet NOx amount exceeds the predetermined threshold), the performance determination circuitry 174a instructs the catalyst active material delivery circuitry 174b to activate the catalyst active material reservoir 140.

The controller 170 also includes a transceiver 178 configured to generate a catalyst delivery signal (e.g., a current or a voltage) configured to activate the catalyst active material reservoir 140. In some embodiments, the transceiver 178 can also be configured to generate an indicating signal configured to indicate to a user that the aftertreatment component 150 (e.g., the SCR system 150) has degraded. For example, the indicating signal may generate a fault code or light a malfunction indicator lamp (MIL), for example located in a dashboard of a vehicle or a system that includes the aftertreatment system 100.

Figure 3:
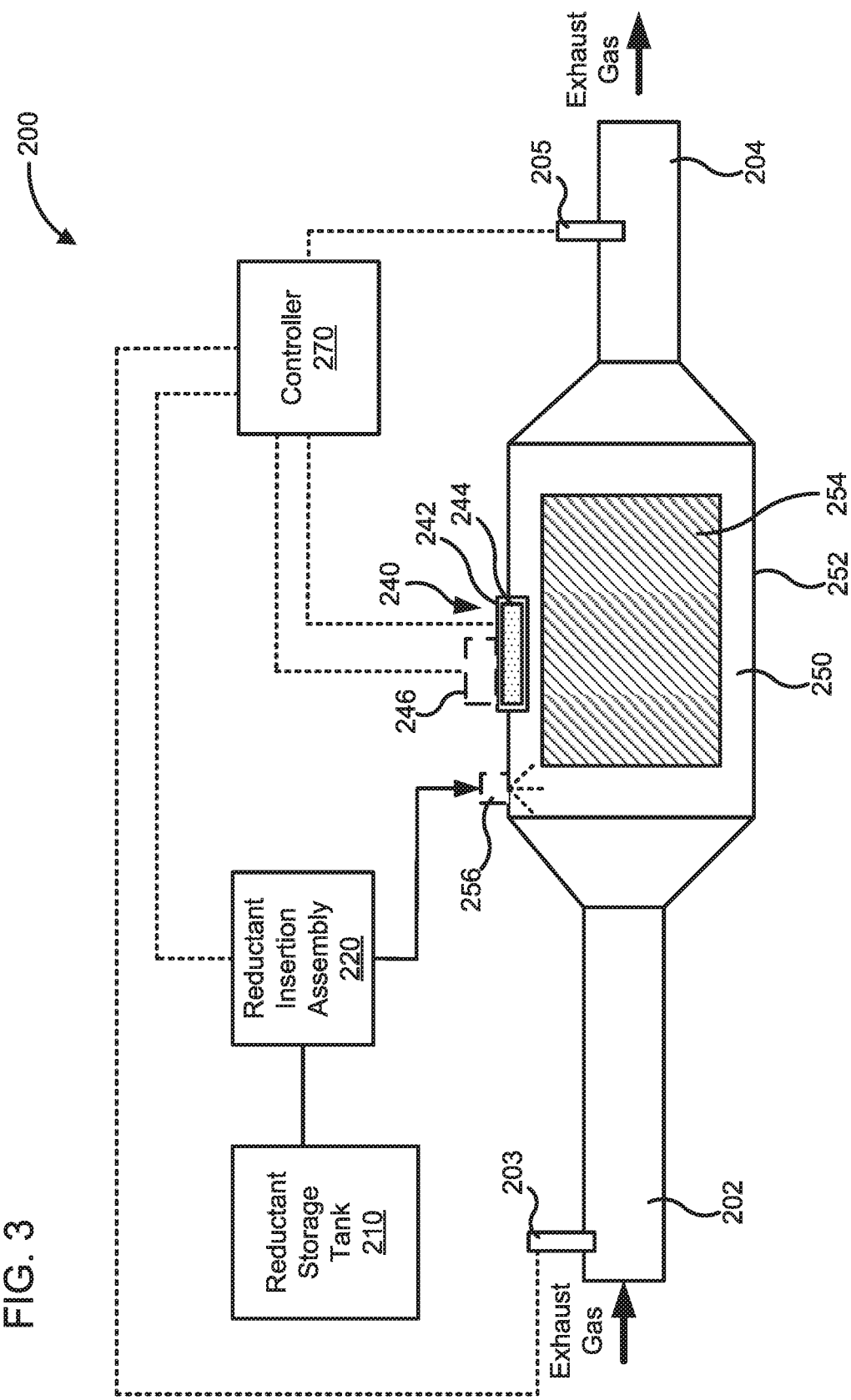
FIG. 3 is a schematic illustration of another embodiment of an aftertreatment system.

FIG. 3 is a schematic illustration of an aftertreatment system 200, according to another embodiment. The aftertreatment system 200 may be fluidly coupled to an engine and configured to decompose constituents (e.g., NOx gases) included in an exhaust gas produced by the engine. The engine can include an IC engine operable on diesel, gasoline, natural gas, biodiesel, ethanol, liquefied petroleum gas (LPG) or any other fuel source. The aftertreatment system 200 includes a SCR system 250, a reductant storage tank 210, a reductant insertion assembly 220, a catalyst active material reservoir 240, and a controller 270. In other embodiments, the aftertreatment system 200 can include any other aftertreatment component in addition to or in place of the SCR system 250 such as an oxidation catalyst, a catalyzed filter and/or an ammonia oxidation catalyst.

The aftertreatment system 200 includes an inlet conduit 202 structured to receive the exhaust gas (e.g., a diesel exhaust gas) from an engine (e.g., a diesel engine), and an outlet conduit 204 structured to expel treated exhaust gas into the environment. An inlet NOx sensor 203 is positioned upstream of the SCR system 250 proximate to an inlet of the inlet conduit 202 and is configured to determine an inlet NOx amount of NOx gases included the exhaust gas entering the aftertreatment system 200. The SCR system 250 is positioned between the inlet conduit 202 and the outlet conduit 204.

An outlet NOx sensor 205 is positioned downstream of the SCR system 250, for example in the outlet conduit 204 and is configured to determine an outlet NOx amount of NOx gases included in the exhaust gas after passing through the SCR system 250. The inlet NOx sensor 203 and the outlet NOx sensor 205 may be substantially similar to inlet NOx sensor 103 and the outlet NOx sensor 105 and, therefore not described in further detail herein.

The SCR system 250 includes a housing 252 defining an internal volume within which a catalyst 254 is positioned. The SCR system 250 and the catalyst 254 may be substantially similar to the SCR system 150 and the catalyst 154 and, therefore not described in further detail herein. A reductant insertion port 256 is provided on a sidewall of housing 252 and structured to allow insertion of a reductant therethrough into the internal volume defined by the housing 252. The reductant insertion port 256 may be positioned upstream of the catalyst 254 (e.g., to allow reductant to be inserted into the exhaust gas upstream of the catalyst 254) or over the catalyst 254 (e.g., to allow reductant to be inserted directly on the catalyst 254).

The reductant storage tank 210 is structured to store a reductant (e.g., a diesel exhaust fluid such as an aqueous urea solution). A reductant insertion assembly 220 is fluidly coupled to the reductant storage tank 210. The reductant insertion assembly 220 is configured to receive the reductant from the reductant storage tank 210 and selectively insert the reductant into the SCR system 250 or upstream thereof (e.g., into the inlet conduit 202) or a mixer (not shown) positioned upstream of the SCR system 250. The reductant storage tank 210 and the reductant insertion assembly 220 may be substantially similar to the reductant storage tank 110 and the reductant insertion assembly 120 and, therefore not described in further detail herein.

The catalyst active material reservoir 240 is structured to contain a catalyst active material therein. As shown in FIG. 3, the catalyst active material reservoir 240 includes a compartment 242 positioned on a sidewall of the housing 252 within which a container 244 containing the catalyst active material is positioned. The compartment 242 is positioned proximate to the catalyst, for example aligned with the catalyst within the housing 252, upstream of the catalyst 254 within the housing 252 or located at a distance which is less than half of a cross-sectional width of the catalyst 254 of the SCR system 250.

The catalyst active material may include the same catalyst active material as described with respect to the aftertreatment system 100. The compartment 242 is selectively fluidly coupleable to an internal volume defined by the housing 252 so as to allow delivery of the catalyst active material contained within the container 244 to the catalyst on demand. For example, the compartment 242 may include a door or valve configured to be selectively opened to fluidly couple the compartment 242 to the internal volume defined by the housing 252 so as to allow delivery of the catalyst active material thereto.

The container 244 may comprise a degradable container configured to disintegrate when subjected to a suitable stimuli. For example, the container 244 may be degradeable by heating to a predetermined temperature so as to release the catalyst active material contained therein. The catalyst active material can be stored within the container 244 of the catalyst active material reservoir 240 in the form of a solution, a suspension, a powder or crystals of the catalyst active material or any other suitable form. In some embodiments, the container 244 may degrade due to exposure to a chemical compound (e.g., an acid, a base or the reductant). In other embodiments, the container 244 may include a frangible container configure to break or shatter so as to release the catalyst active material contained therein.

In some embodiments, the container 244 may be degradable via heat. In such embodiments, a heat source 246 may be operatively coupled to the compartment 242. The heat source 246 is configured to selectively heat the compartment 242 and, thereby the container 244 so as to disintegrate the container 244. In some embodiments, the heat source 246 may include an electric heater. In other embodiments, the heat source 246 may include the heat generated by the engine.

For example, the heat source 246 may include one or more conduits configured to selectively deliver a heated engine coolant carrying heat away from the engine, or a portion of the exhaust gas generated by the engine to the compartment 242. The heated coolant or portion of the exhaust gas heats the compartment 242 and, thereby degrades the degradable container 244 positioned therein to release the catalyst active material contained therein. The compartment 242 may be heat insulated from the housing 252 so that the hot exhaust gas flowing through the housing 252 of the SCR system 250 does not heat the compartment 242.

As described before, the catalyst active material reservoir 240 may be activated once the performance of the SCR system 250 degrades to a level where the SCR system 250 has a first catalytic conversion efficiency at which the outlet NOx amount (e.g., determined by the outlet NOx sensor 205) exceeds a predetermined threshold (e.g., a maximum allowable outlet NOx amount as set by an emission standard). The catalyst active material reservoir 240 may be activated to selectively deliver the catalyst active material to the SCR system 250 in-situ (i.e., without removing the SCR system 250 or the catalyst 254 from the aftertreatment system 200) to remanufacture the catalyst 154.

The controller 270 is communicatively coupled to the catalyst active material reservoir 240, the outlet NOx sensor 205, and optionally also to the heat source 246, the inlet NOx sensor 203 and the reductant insertion assembly 220. The controller 270 may be substantially similar in structure and function to the controller 170. The controller 270 is configured to interpret an outlet NOx signal from the outlet NOx sensor 205. The outlet NOx signal is indicative of an outlet NOx amount of NOx gases included in the exhaust gas after passing through the SCR system 250. For example, the controller 270 may include the outlet NOx amount determination circuitry 174a configured to interpret the outlet NOx signal.

The controller 270 may also determine the outlet NOx amount (e.g., an absolute value or a range from the outlet NOx signal). In some embodiments, the controller 270 is configured to interpret an inlet NOx signal form the inlet NOx sensor 203, and determine the inlet NOx amount therefrom. The controller 270 may also use the inlet NOx amount to determine the outlet NOx amount (e.g., normalize or correct the outlet NOx amount determined by the outlet NOx sensor 205 using the inlet NOx amount).

The controller 270 determines if the outlet NOx amount exceeds a predetermined threshold (e.g., via the outlet NOx determination circuitry 174a included in the controller 270). In response to the outlet NOx amount exceeding the predetermined threshold, the controller 270 activates the catalyst active material reservoir 240 for a predetermined time so as to deliver a predetermined amount of the catalyst active material to the SCR system 250.

For example, the controller 270 may also include the catalyst active material delivery circuitry 174b. If the outlet NOx amount exceeds the predetermined threshold, the controller 270 or the catalyst active material delivery circuitry 174b included in the controller 270 may activate the heat source 246 for a predetermined time. This causes the heat source 246 to heat the compartment 242 and thereby the heat degradable container 244 containing the catalyst active material.

The increase in temperature causes the container 244 to disintegrate and release the catalyst active material contained therein into the compartment 242. The controller 270 or the catalyst active material delivery circuitry 174b may also be configured to fluidly couple the compartment 242 to the internal volume of the housing 252 (e.g., by opening a door or activating a valve), thereby delivering the catalyst active material to the catalyst 254 of the SCR system 250.

It is to be noted that, while aftertreatment system 200 is described as including the SCR system 250 and the catalyst active material reservoir 240 positioned thereon or proximate thereto, in other embodiments, the aftertreatment system 200 may include any other aftertreatment component that includes a catalyst as described herein. Individual catalyst active material reservoirs 240 may be positioned on or proximate to each of the aftertreatment components and include a catalyst active material specifically formulated for the corresponding aftertreatment component. If any one of the aftertreatment components is deactivated, only the corresponding catalyst active material reservoir 240 positioned on or proximate to the respective aftertreatment component is activated (e.g., via the controller 270 activating the heat source 246 operatively coupled thereto) so as to deliver the catalyst active material to only the respective aftertreatment component and remanufacture the respective aftertreatment component.

Figure 4:
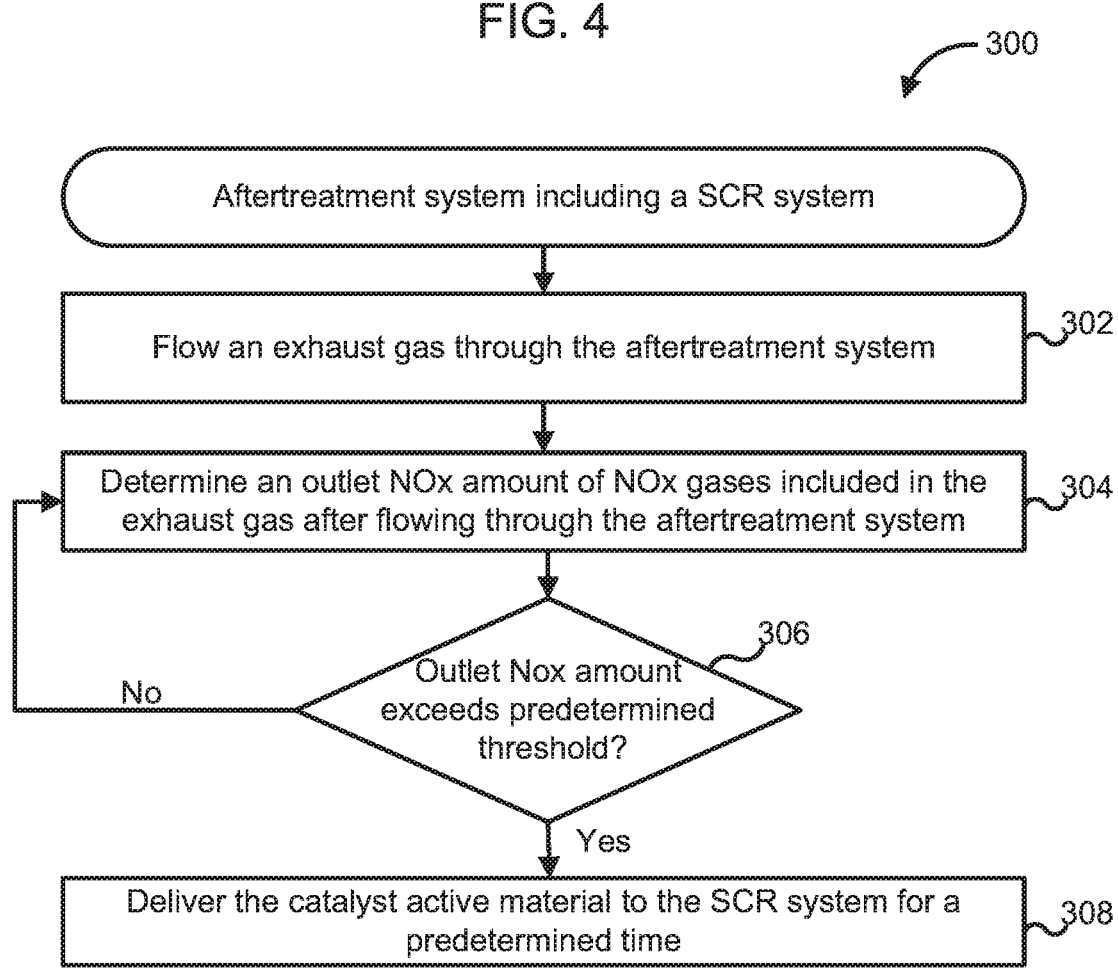
FIG. 4 is a schematic flow diagram of an embodiment of a method for coating a catalyst included in a SCR system by flowing a catalyst active material therethrough.

FIG. 4 is a schematic flow diagram of an example method 300 for remanufacturing a SCR system (e.g., the SCR system 150/250) included in an aftertreatment system (e.g., the aftertreatment system 100/200). The method 300 includes flowing an exhaust gas through the aftertreatment system at 302. For example, the aftertreatment system may be fluidly coupled to an engine (e.g., a diesel engine) generating the exhaust gas (e.g., a diesel exhaust gas).

An outlet NOx amount of NOx gases included in the exhaust gas after flowing through the aftertreatment system is determined at 304. For example, the controller 170/270 interprets an outlet NOx signal from the outlet NOx sensor 105/205 and determines the outlet NOx amount therefrom. The method 300 determines if the outlet NOx amount exceeds a predetermined threshold at 306. For example, the controller 170/270 or the outlet NOx amount determination circuitry 174a included in the controller 170/270 determines if the outlet NOx amount exceeds the predetermined threshold.

If the outlet NOx amount does not exceed the predetermined threshold, the method returns to operation 304. If, on the other hand, the outlet NOx amount exceeds the predetermined threshold, the catalyst active material is delivered to the SCR system for a predetermined time at 308. For example, the controller 170 activates the catalyst active material reservoir 140 for the predetermined time so as to deliver a predetermined amount of the catalyst active material to the SCR system 150. Similarly, the controller 270 may activate the heat source 246 for a predetermined time so as to heat and disintegrate the container 244. This causes the predetermined amount of the catalyst active material contained within the container 244 to be delivered to the SCR system 250.

Figure 5:
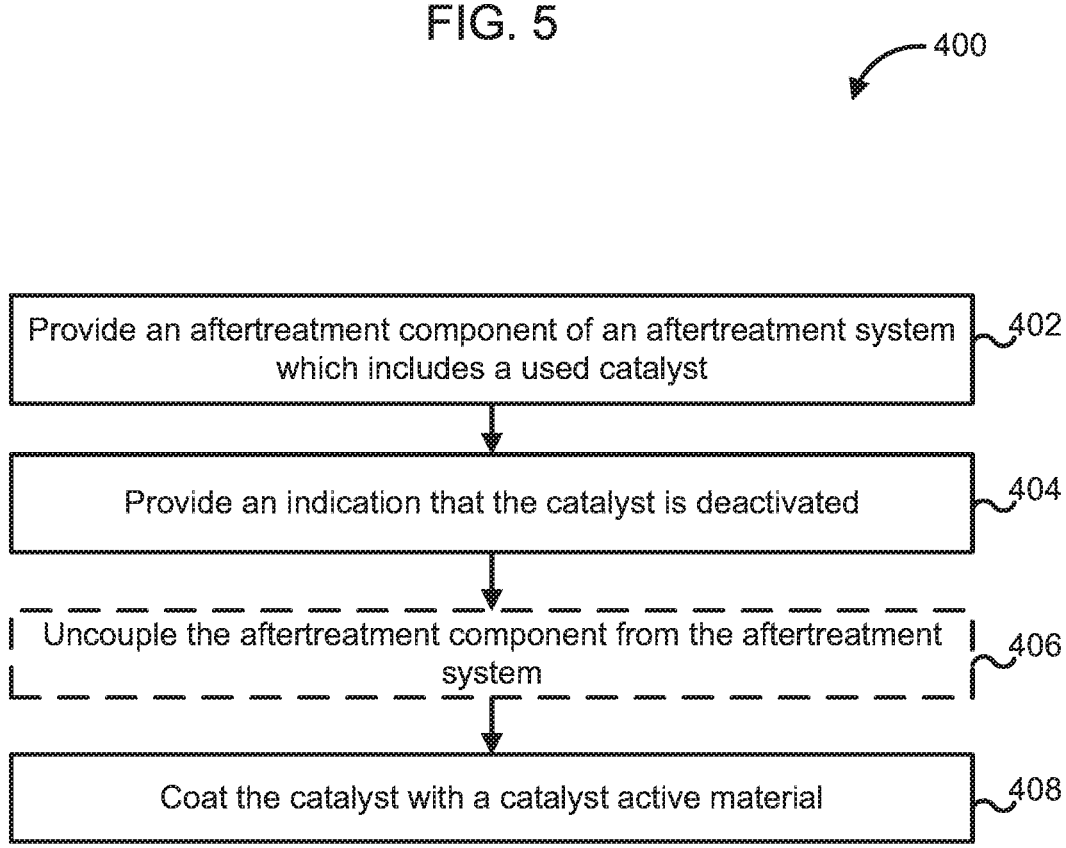
FIG. 5 is a schematic flow diagram of another embodiment of a method for coating a catalyst active material on a deactivated catalyst included in an aftertreatment component of an aftertreatment system so as to remanufacture the catalyst.

FIG. 5 is a schematic flow diagram of another example method 400 for remanufacturing a deactivated aftertreatment component (e.g., the aftertreatment component 150/

250). The method 400 includes providing a an aftertreatment component of an aftertreatment system which includes a used catalyst at 402. For example, the aftertreatment component 150/250 is provided which includes the used catalyst 154/254.

An indication is provided that the catalyst is deactivated at 404. For example, the controller 170/270 indicates to a user that the catalyst 154/254 included in the aftertreatment component 150/250 has deactivated. In response to the indication that the catalyst is deactivated, the catalyst is coated with a coating of a catalyst active material so as to remanufacture the catalyst at 408. For example, the catalyst active material 140/240 is fluidly coupled to the aftertreatment component 150/250 so as to deliver the catalyst active material to the deactivated catalyst 154/254 and coat the catalyst 154/254.

In some embodiments, the catalyst is coated with the catalyst active material while the aftertreatment component is coupled to the aftertreatment system. For example, the aftertreatment system 100/200 also includes the catalyst active material reservoir 140/240 which is fluidly coupled to the aftertreatment component 150/250. The controller 170/270 determines that the catalyst 154/254 is deactivated and in response thereto, activates the catalyst active material reservoir 140/240 to deliver the catalyst active material to the aftertreatment component 150/250 without uncoupling the aftertreatment component 150/250 from the aftertreatment system 100/200.

In other embodiments, the method 400 also includes uncoupling the aftertreatment component from the aftertreatment system at operation 406 before coating the catalyst with the catalyst active material at operation 408. For example, once it is determined that the aftertreatment component 150/250 or the catalyst 154/254 included therein has deactivated (e.g., by the controller 170/270), the aftertreatment component 150/250 is uncoupled from the aftertreatment system 100. The catalyst active material reservoir 140/240 may then be fluidly coupled to the housing 152/252 of the aftertreatment component 150/250 as described herein so as to deliver the catalyst active material to the catalyst 154/254 positioned within the housing 152/252 without removing the catalyst 154/254 from the housing 152/252.

Figure 6:
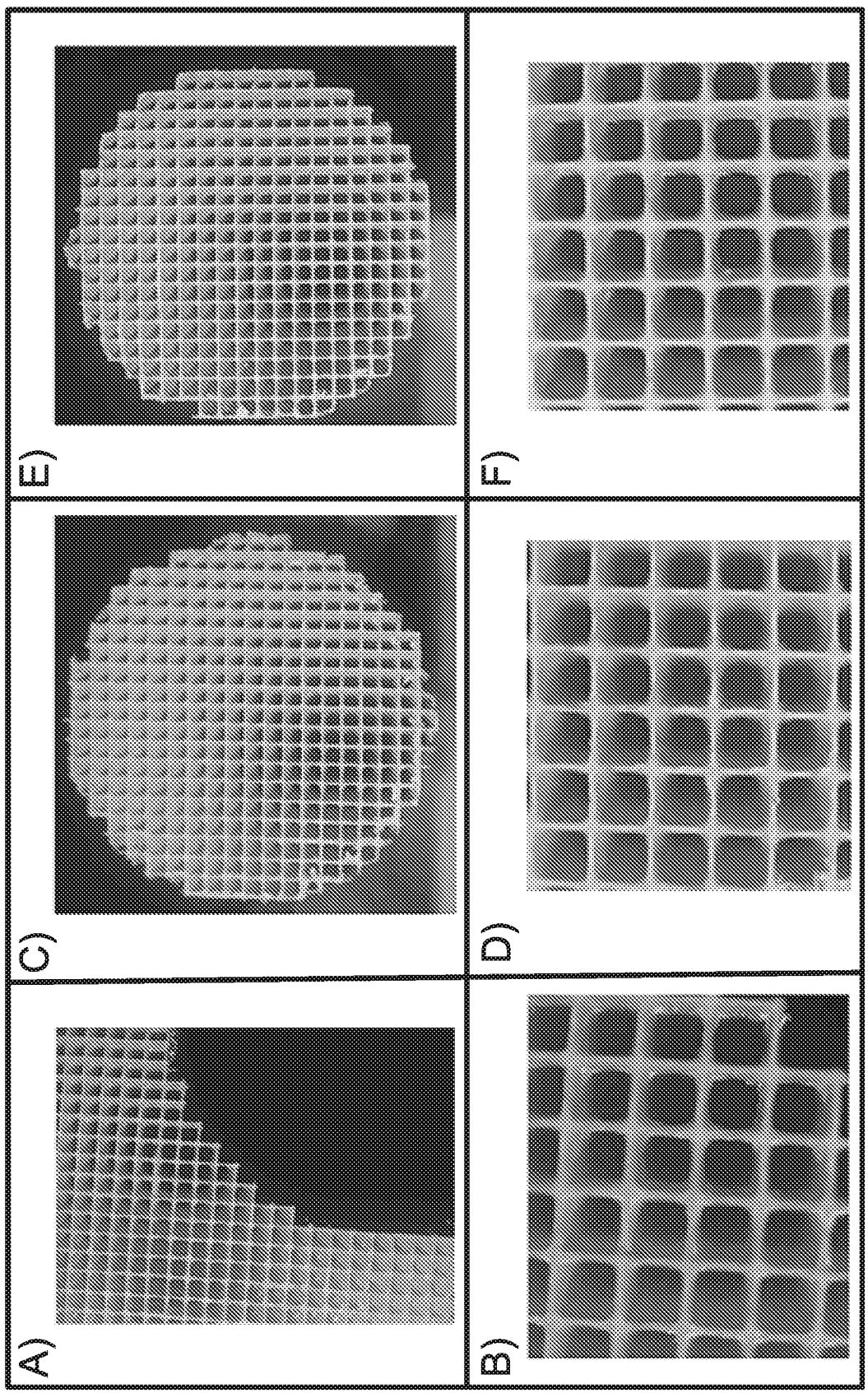
FIG. 6 panel A is a side view of a catalyst of an SCR system which has been in operation for a period of time.

FIG. 6 panel A is a side view of a catalyst of an SCR system which has been in operation for a period of time, and FIG. 6 panel B is an enlarged view thereof. The catalyst includes a 1 inch by 3 inch core. The catalyst was coated with 10 wt % or 20 wt % catalyst active material, and calcined in a standard air oven. No pretreatment was performed on the catalyst before the coating so that any hydrocarbons or poisons included in the catalyst before the coating process remained therein.

FIG. 6 panel C is a side view of the SCR catalyst of FIG. 6 panel A/B after coating with 10% catalyst active material, and FIG. 6 panel D is an enlarged view thereof. FIG. 6 panel E is a side view of the SCR catalyst of FIG. 6 panel A/B after coating with 20% catalyst active material, and FIG. 6 panel F is an enlarged view thereof. Clearance between the cells of the catalyst after coating was determined visually. Adhesion of the catalyst active material deposited on the catalyst was determined via an air gun. No cell plugging or other significant structural difference was observed after coating.

Figure 7:
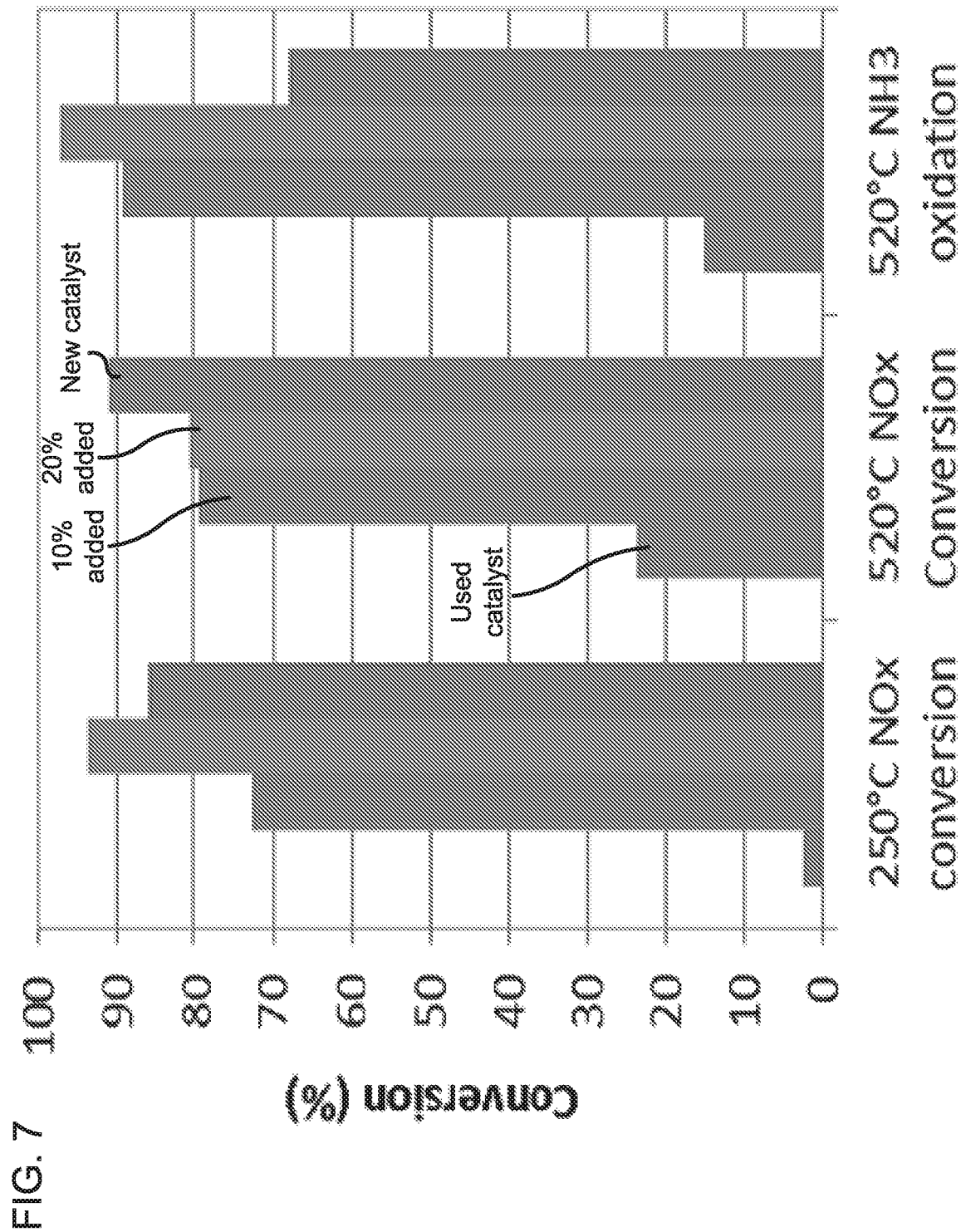
FIG. 7 is a bar chart of NOx catalytic conversion efficiency at 220 and 550 degrees Celsius of a used catalyst, the used catalyst coated with 10% catalyst active material, the used catalyst coated with 20% catalyst active material and a new catalyst, and ammonia oxidation efficiency thereof.
Figure 8:
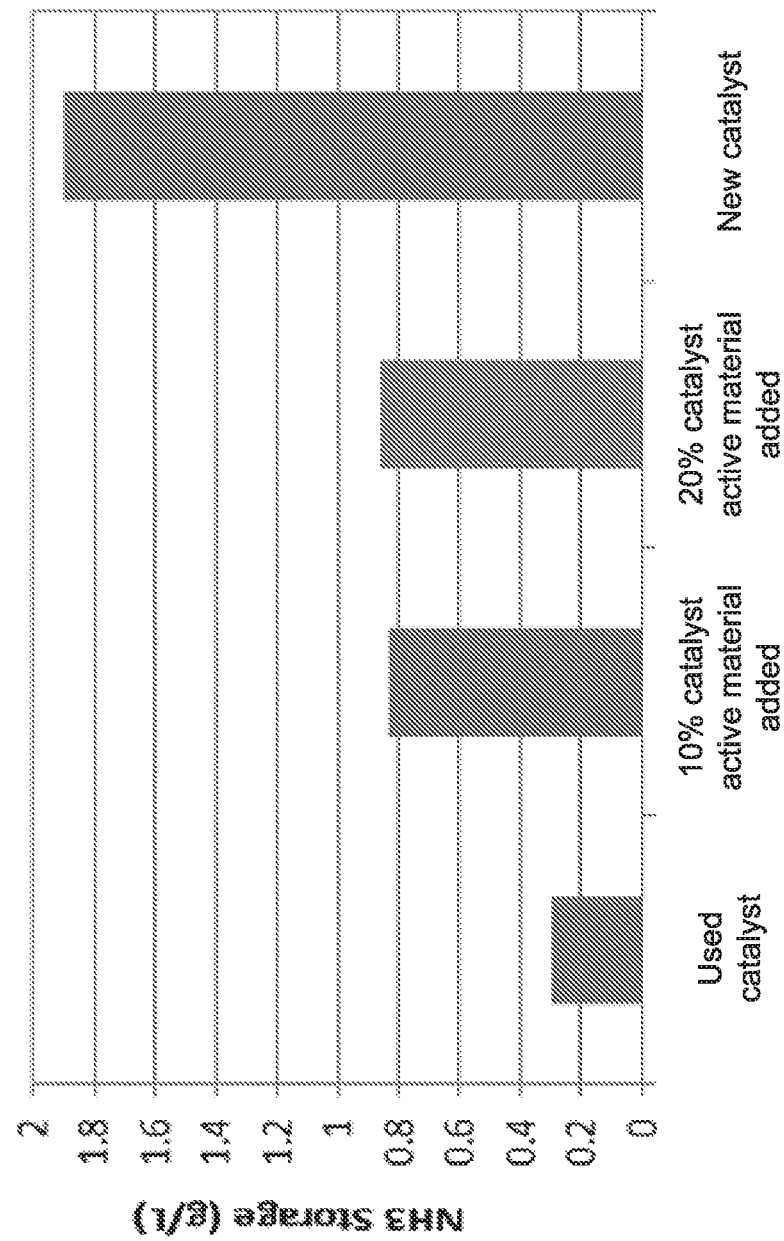
FIG. 8 is a bar chart of ammonia storage capacity of the used catalyst, the used catalyst coated with 10% catalyst active material, the used catalyst coated with 20% catalyst active material and the new catalyst of FIG. 7.

A new catalyst, a used catalyst, the used catalyst coated with 10 wt % (hereinafter "the used-10 catalyst") and the used catalyst coated with 20 wt % (hereinafter "the used-20 catalyst") active material was tested to determine the catalytic conversion efficiency of each of the catalysts. For testing, the catalysts were subjected to an air flow including 500 ppm NO, 500 ppm $NH_3$, 10% $O_2$, 5% $CO_2$, and 5% water to simulate an exhaust gas, FIG. 7 is a bar chart of NOx catalytic conversion efficiency at 220 and 550 degrees Celsius of the used catalyst, the used-10 catalyst, the used-20 catalyst and the new catalyst, and ammonia oxidation efficiency thereof. The used-10 catalyst and the used-20 catalyst show significant improvement in catalytic conversion efficiency towards NOx conversion at 250 degrees Celsius and 520 degrees Celsius relative to the used catalyst. The used-10 catalyst and the used-20 catalyst also demonstrate significantly higher ammonia conversion efficiency relative to the used as well as the new catalyst at 520 degrees Celsius FIG. 8 is a bar chart of ammonia storage capacity of the used catalyst, the used-10 catalyst, the used-20 catalyst active material and the new catalyst. Both the used-10 catalyst and the used-20 catalyst have a significantly higher ammonia storage capacity relative to the used catalyst.

Figure 9:
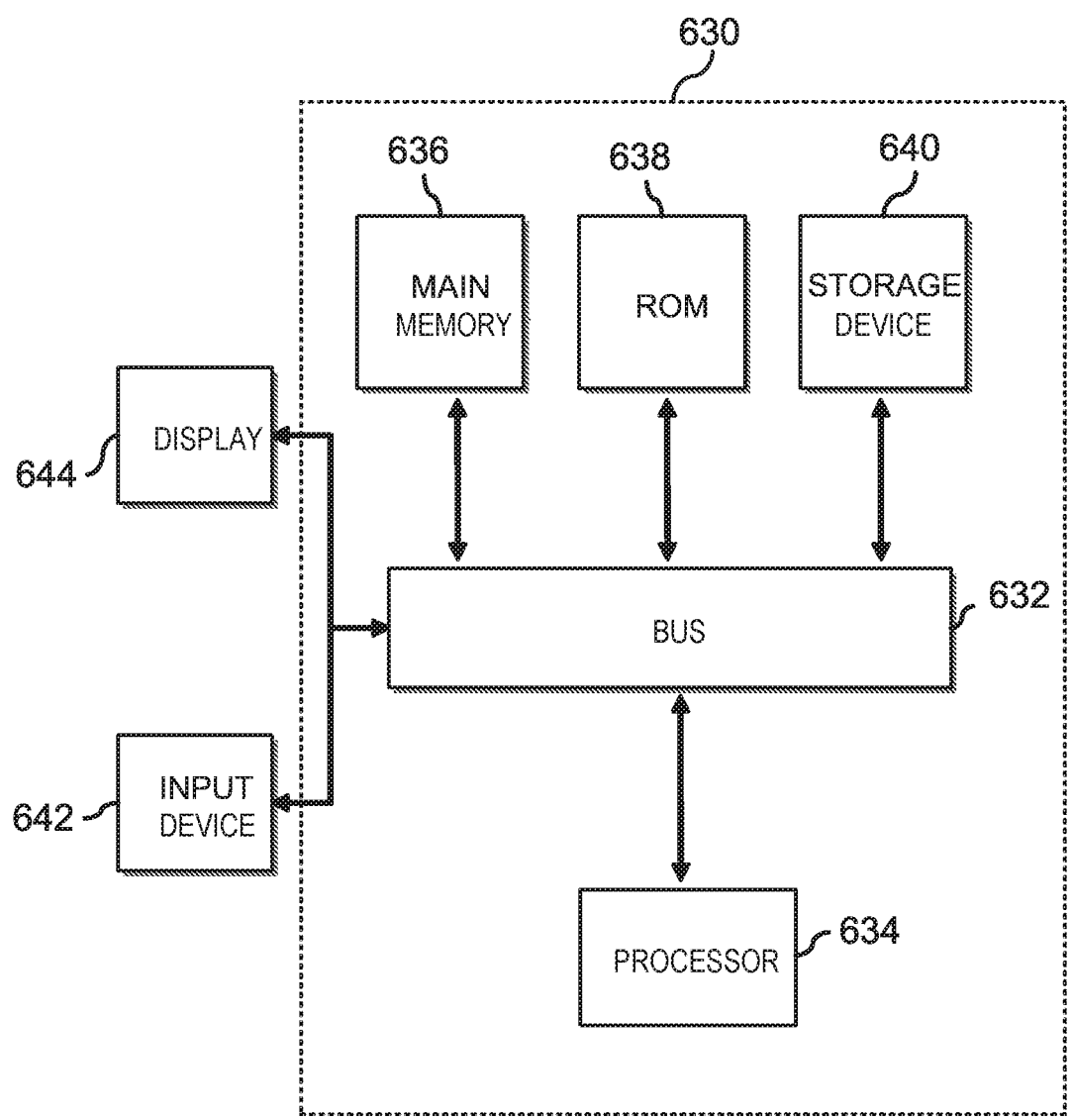
FIG. 9 is a schematic block diagram of another embodiment of a computing device that can be used as the controller of FIG. 1, FIG. 2 and/or FIG. 3.

In some embodiments, the controller 170/270, the control circuitry 171 or any of the controller or control circuitries described herein can comprise a system computer of an apparatus or system which includes the aftertreatment system 100 (e.g., a vehicle, an engine or generator set, etc.). For example, FIG. 9 is a block diagram of a computing device 630 in accordance with an illustrative implementation. The computing device 630 can be used to perform any of the methods or the processes described herein, for example the method 300. In some embodiments, the controller 170 can include the computing device 630. The computing device 630 includes a bus 632 or other communication component for communicating information. The computing device 630 can also include one or more processors 634 or processing circuits coupled to the bus 632 for processing information.

The computing device 630 also includes main memory 636, such as a random access memory (RAM) or other dynamic storage device, coupled to the bus 632 for storing information, and instructions to be executed by the processor 634. The main memory 636 can also be used for storing position information, temporary variables, or other intermediate information during execution of instructions by the processor 634. The computing device 630 may further include ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions for determining the initial flow velocity, and comparing the initial flow velocity to the predetermined threshold and increasing or decreasing the cross-sectional area of the exhaust conduit corresponding thereto, can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a display 644, e.g., a touch screen display.

According to various implementations, the processes and methods described herein can be implemented by the computing device 630 in response to the processor 634 executing an arrangement of instructions contained in main memory 636 (e.g., the operations of the method 300). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hardwired may be used in place of or in combination with software instructions to effect illustrative implementations. Thus, implementations are not limited to any specific combination of hardware and software.

Although an example computing device has been described in FIG. 9, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs, i.e., one or more circuitries of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
   an aftertreatment component;
   an outlet sensor positioned downstream of the aftertreatment component;
   a catalyst active material reservoir fluidly coupled to the aftertreatment component and a controller communicatively coupled to the outlet sensor and the catalyst active material reservoir, the controller configured to:
      interpret an outlet signal from the outlet sensor, the outlet signal indicative of a performance of the aftertreatment component,
      determine if the aftertreatment component has deactivated, and
      in response to determining that the aftertreatment component has deactivated, activate the catalyst active material reservoir so as to deliver a predetermined amount of the catalyst active material to at least a portion of the aftertreatment component, the catalyst active material coating at least the portion of the aftertreatment component so as to remanufacture the aftertreatment component.

2. The aftertreatment system of claim 1, wherein the aftertreatment component has a first catalytic conversion efficiency before coating the catalyst active material thereon, and wherein coating the catalyst active material on the aftertreatment component causes the aftertreatment component to have a second catalytic conversion efficiency higher than the first catalytic conversion efficiency.

3. The aftertreatment system of claim 2, wherein the aftertreatment component comprises a catalyst through which the exhaust gas flows, and wherein the coating of the catalyst active material is formed on the catalyst.

4. The aftertreatment system of claim 1, wherein the aftertreatment component is coated with the catalyst active material while the aftertreatment component is coupled to the aftertreatment system.

5. The aftertreatment system of claim 1, wherein the aftertreatment component includes a housing defining an internal volume within which the catalyst is positioned.

6. The aftertreatment system of claim 5, wherein the aftertreatment components includes a selective catalytic reduction system, and wherein the catalyst active material reservoir is fluidly coupled to the selective catalytic reduction system via at least one of a reductant insertion port and a temperature sensor port positioned on the housing.

7. The aftertreatment system of claim 1, wherein the catalyst active material reservoir includes a degradable container containing the catalyst active material therein.

8. The aftertreatment system of claim 7, further comprising:
   a heat source operatively coupled to the degradable container, wherein the controller is further configured to activate the heat source so as to heat the degradable container, the degradable container configured to disintegrate by the heat so as to deliver the catalyst active material to the aftertreatment component.

9. The aftertreatment system of claim 1, wherein the catalyst active material includes a solution of the catalyst active material, a suspension of the catalyst active material or a powder of the catalyst active material.

10. The aftertreatment system of claim 1, wherein the catalyst active material is provided in the range of greater than 0 and less than 100 wt %.

11. A method comprising:
   providing an aftertreatment component disposed within an aftertreatment system, the aftertreatment component including a catalyst which has been used in the aftertreatment system;
   determining that the catalyst has deactivated; and
   in response to determining that the catalyst has deactivated, causing a catalyst active material reservoir that is fluidly coupled to the aftertreatment component to deliver a predetermined amount of the catalyst active material to the aftertreatment component so as to coat the catalyst with the catalyst active material without removing the aftertreatment component from the aftertreatment system, thereby remanufacturing the catalyst.

12. The method of claim 11, wherein the coating of the catalyst with the catalyst active material is performed while the aftertreatment component is coupled to the aftertreatment system.

13. The method of claim 11, further comprising supplying a first pulse of a reductant to the aftertreatment component upstream of the catalyst.

14. The method of claim 13, further comprising supplying the catalyst active material to the catalyst after supplying the first pulse of the reductant to the aftertreatment component.

15. The method claim 14, further comprising supplying a second pulse of the reductant to the aftertreatment component after supplying the catalyst active material.

16. The method of claim 13, further comprising supplying the catalyst active material to the catalyst simultaneously with supplying the first pulse of the reductant to the aftertreatment component.

17. The method of claim 11, wherein the catalyst active material comprises a same material as the catalyst.

18. The method of claim 11, wherein coating of the catalyst with the catalyst active material increases a catalytic conversion efficiency of the aftertreatment component.

19. A method comprising:
   providing an aftertreatment component disposed within an aftertreatment system, the aftertreatment component including a catalyst which has been used in the aftertreatment system;
   determining whether the catalyst has deactivated;
   in response to determining that the catalyst has deactivated, coating the catalyst with a coating of a catalyst active material so as to remanufacture the catalyst by:
      supplying a first pulse of a reductant to the aftertreatment component upstream of the catalyst, and supplying the catalyst active material to the catalyst simultaneously with supplying the first pulse of the reductant to the aftertreatment component.

\* \* \* \* \*